Figure 5:
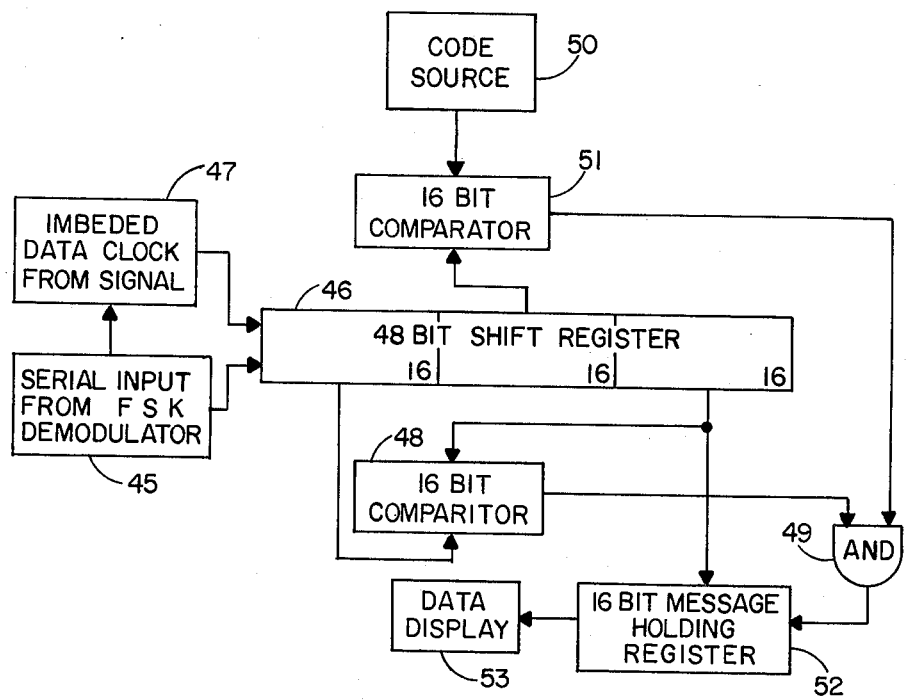

United States
Cunningham

[11] 3,944,742
[45] Mar. 16, 1976

[54] BURST FREQUENCY SHIFT KEYING DATA COMMUNICATION SYSTEM

[75] Inventor: Paul M. Cunningham, Richardson, Tex.

[73] Assignee: Spectradyne, Inc., Richardson, Tex.

[22] Filed: Apr. 1, 1974

[21] Appl. No.: 457,087

[52] U.S. Cl............ 178/66 R; 178/DIG. 13; 325/30; 325/31; 325/53; 325/58; 325/308
[51] Int. Cl.²...................... H04L 27/10; H04B 3/50
[58] Field of Search................... 325/30, 31, 51–53, 325/308, 57, 58; 178/DIG. 13, DIG. 23, 66 R; 179/15 BA; 343/201, 204, 207

[56] References Cited
UNITED STATES PATENTS

| | | | |
|---|---|---|---|
| 2,478,919 | 8/1949 | Hansell | 343/207 |
| 2,513,910 | 7/1950 | Bliss | 343/201 |
| 3,384,822 | 5/1968 | Miyagi | 325/30 |
| 3,444,320 | 5/1969 | Miyagi | 178/50 |
| 3,471,646 | 10/1969 | Magnuski et al. | 179/15 |
| 3,472,965 | 10/1969 | Blossom | 179/2 |
| 3,485,953 | 12/1969 | Norberg | 179/15 |
| 3,833,757 | 9/1974 | Kirk, Jr. et al. | 178/5.6 |

Primary Examiner—Robert L. Griffin
Assistant Examiner—Marc E. Bookbinder
Attorney, Agent, or Firm—Warren H. Kintzinger

[57] ABSTRACT

A communications system for transmission of low density digital data from a plurality of transmitters to a common receiver. It is a burst-mode frequency shift keying (FSK) communication system useable with a master antenna television (MATV) system that minimizes mutual interference between outputs of a large number of transmitters individually located with TV sets. The transmitters are combined with converters for transmission of programs through the system to individual TV sets as controlled by the users, and with information such as TV channel in use, room number identification, and specialized information such as completion of maid service, fire, and burglary alarms transmitted back through the system. In one system the transmitters use a carrier frequency of 12MH$_z$, a frequency at the lower end of the passband of a coax system with FSK modulation at an equivalent switching rate of 20KH$_z$ and modulation index of 5 accepting a RF channel loading of up to 700 simultaneous users.

15 Claims, 10 Drawing Figures

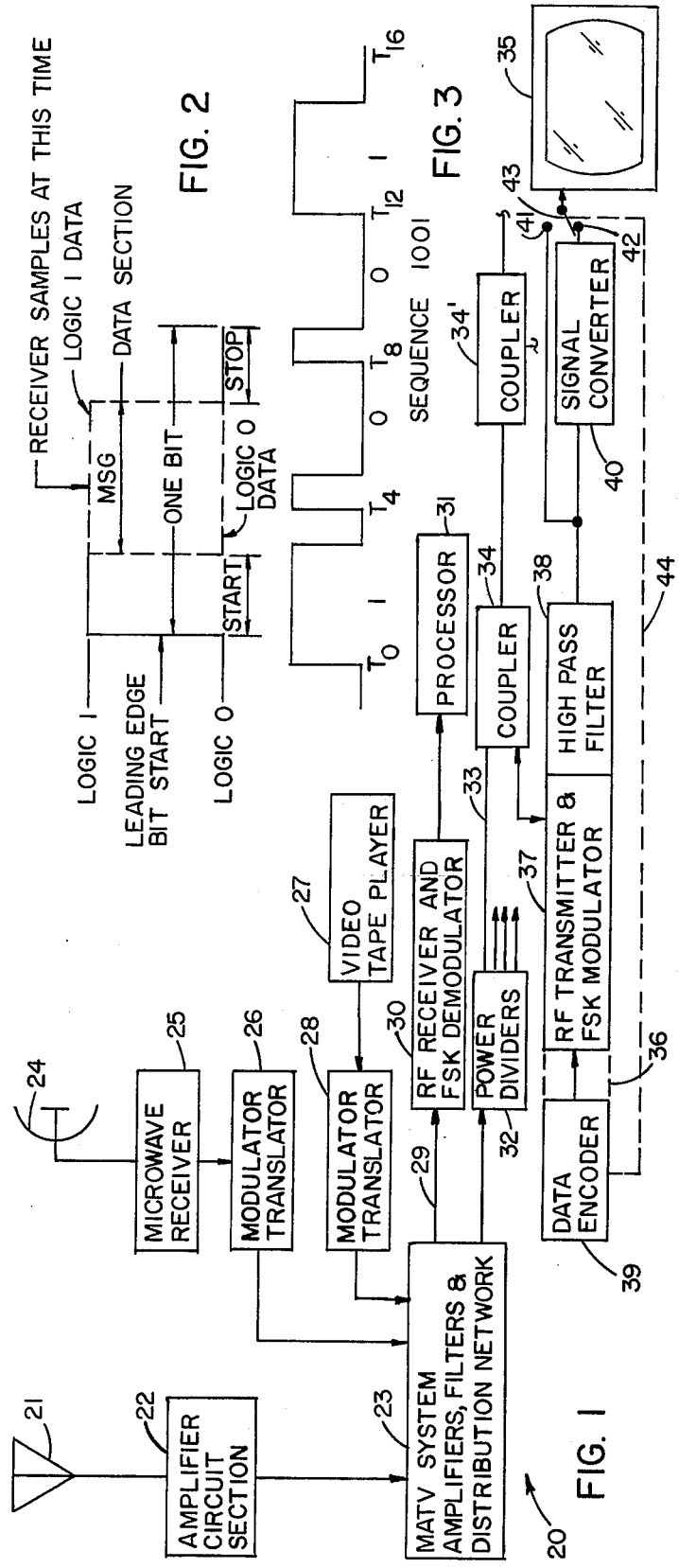

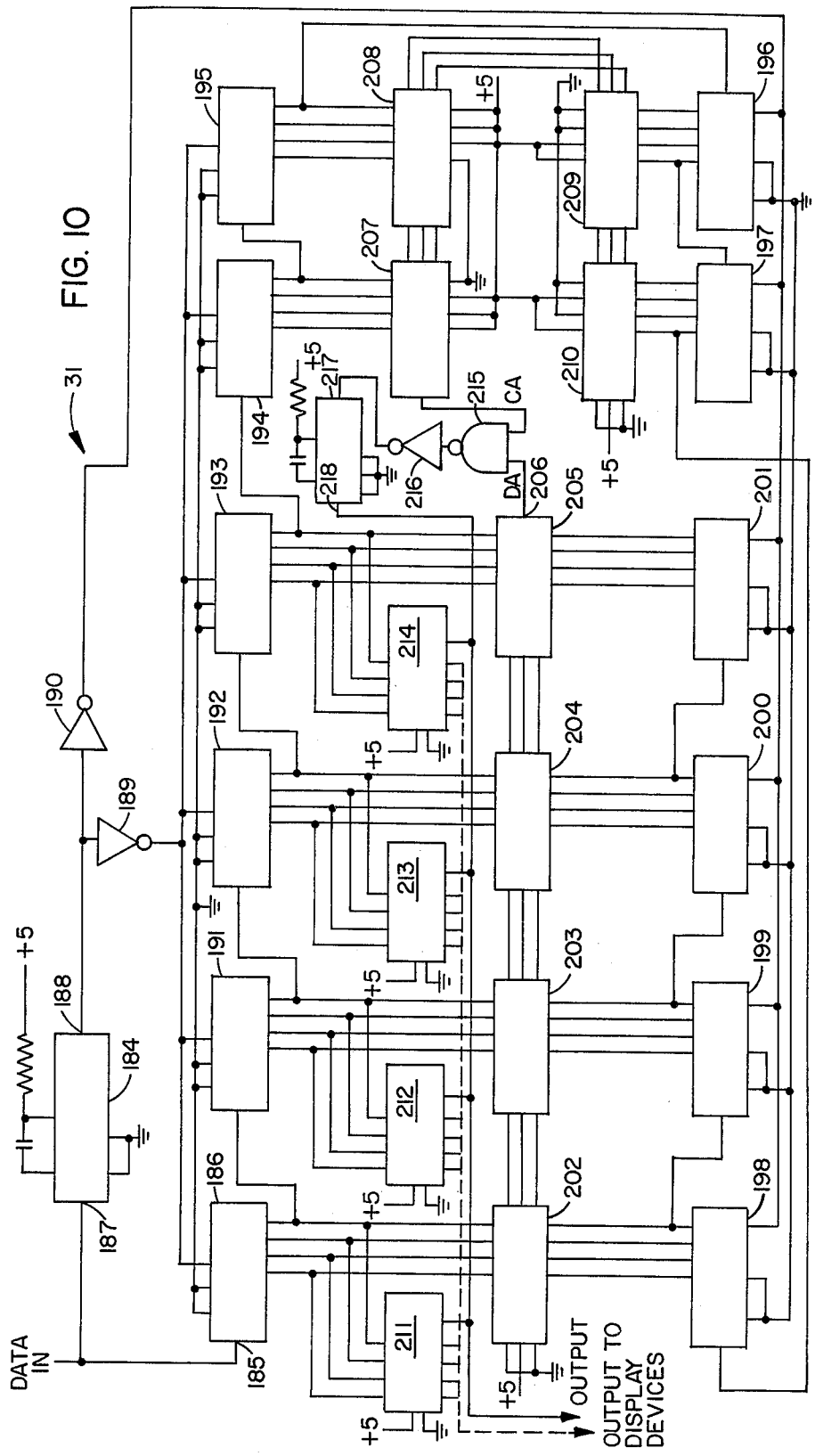

BURST FREQUENCY SHIFT KEYING DATA COMMUNICATION SYSTEM

This invention relates in general to RF signal transmitting systems, and in particular, to a multi-transmitter to single receiver (or releatively few receivers) burst frequency shift keying (FSK) RF data communication system.

In achieving efficient communication of low density digital data in RF communication systems using transmission of data from many transmitters to a single receiver (or a few receivers in some installations) as could be used with a community antenna television system in transmitting data from a plurality of users to a central point, various problems are faced. A typical application for such a system is in a motel/hotel TV distribution system to automatically report the TV channel in use, room number identification, and specialized features such as completion of maid service, fire, and burglary alarms. In achieving acceptable, economically feasible, minimal system costs use, for example, of an existing coax TV distribution network system is suggested without requiring additional coax or wire communications. While the primary objective with a TV system equipped with such a system is the collection of charges for specialized TV coverage such as local professional football and first-run movies, other advantages such as fire and burglary alarms and an up-to-the-minute status of room availability add to the economic potential. Applicant presents a burst mode FSK RF communication system that meets unique and stringent application requirements. Many transmitters supply information to one receiving point while conventional existing communication systems usually involve a one-to-one or more transmitter to receiver(s) situation, with a predominate problem being to control transmissions to minimize mutal interference between a large number of transmitters. With existing master television systems the RF communications must use existing coax in a community antenna distribution system wherein the RF communication frequency must propogate through the coax system and, at the same time, not be a threat to the reception of TV signals. It is essential that potential bandwidth for additional TV channels not be usurped since one goal of an overall system is to provide special TV coverage not available using the current TV channelization of the specific area of the system. It is important that signal levels be relatively low in order to avoid interference with TV signals in a system which might employ up to 1000 transmitters. The RF communications signal must be through simple bridging of system coax line to users' TV set inputs with connection to the outputs of termination units installed behind the wall. It is important that the communication system be substantially completely independent of the user TV sets with connection by any other expedient than bridging the input coax forbidden. All specialized TV signals are at frequencies outside the assigned TV bands with localized converters used to translate those signals into suitable channels for acceptance and display by the users TV in a conventional manner. Desired information that one or more of these specialized signals is in use is transmitted to a central point and/or the billing office of the hotel to bill the customer for viewing of special supplemental TV coverage.

It is, therefore, a principal object of this invention to provide an RF transmission system usable with a master antenna television (MATV) system with minimized mutual interference between outputs of a large number of transmitters individually located with TV sets.

Another object is to achieve acceptable economically feasible minimal costs in a highly reliable RF communications system.

A further object is to provide such an RF communications system with the RF frequency used to propogate through the coax distribution system of a TV system not affecting the reception of TV signals and not usurping additional TV channels usable for special TV coverage.

Features of this invention useful in accomplishing the above objectives include, in a multi-transmitter to a single receiver (or relatively few receivers) burst frequency shift keying (FSK) RF data communication system, use of a frequency translator or converter along with an RF transmitter at each TV set location. The system uses conventional 115 volt AC 60 Hz power, and has maid service information input along with specialized room sensor connections for fire and security purposes as well as room number identification automatically included in each transmission.

In a working system 12MHz is used as the RF carrier frequency with this being a frequency at the lower end of the passband of the coax system used with a typical loss from room to central receiver point being in the order of 60 db. This 12MHz carrier frequency is a good choice since it is well removed from the lower TV channels starting at 60MHz. With the system FSK with approximately ± 150KHz deviation is used along with a message stream 64 bits long, 100 microseconds per bit, and an embedded clock. Thus, the equivalent switching rate of the modulation is 20KHz for a modulation index of 5, a rate providing good reproduction of the switching waveform and reduction of the relative frequency stability requirements of the transmitters and the receiver, which at the same time provide a modicum of spectrum conservation. This is important in allowing additional RF channels that could be as close as 500KHz as an expansion option to additional RF channels giving a fallback should, for example, an ultimate loading of as many as 1000 users per channel not be satisfactory. Further, possibilities of expansion by several frequency separated channels is useful growth potential for expanded message lengths and/or increased message density, should this become necessary at a later date. It is an RF communication system that can tolerate up to 0.2 volts rms at 12MHz without apparent interference from the narrow band signal at 12MHz.

System constraints exclude additional wiring (and/or signaling) to prohibit a system concept based on synchronized transmissions from individual rooms. Synchronization from the TV sets is also excluded since this would require connections of RF transmitters to TV sets. Further, system cost constraints clearly exclude a system based upon a response when polled by a signal from the central office with the cost of many special purpose receivers co-located with TV sets in various room locations being clearly prohibitive. Still further, the very large number of transmitters with the RF system used obviously excludes any form of continuous transmission from each transmitter. Synchronization by use of stable clocks is inappropriate because of costs as well as the absence of specialized personnel and equipment to insure synchronization without a synchronizing communication link. Thus, an RF carrier as FSK modulated and gated for short burst transmissions as implemented by applicant is an excellent working system. While single burst transmissions of short messages from individual transmitters might overlap and thereby become lost, and multiple burst transmissions increase the probability of overlaps, the potential for successful transmission is enhanced if the bursts are extremely well isolated as would be the case if transmissions were only at times when the message or data is changed from a previous situation. Further, repetitive burst transmission as used is attractive from the standpoint that eventually the message or data is delivered and accepted. If, for example, the repetition period is on the order of 10,000 times the burst duration, it appears that 1000 individual signals could be accommodated at a chance of 10% interference assuming that the phase of the individual repetition rate clocks becomes uniformly distributable and that the same repetition rate is employed for each. Slightly different repetition periods are employed to insure something like uniform phase distribution. In fact, since the repetition rate sources cannot be precisely synchronized, as well as excluding the possibility of their being uniformly staggered in phase, it is apparent that repetition rate differences would always exist in any non-synchronized system.

Use of crude and non-stable repetition rate oscillators would be compatible with many of the objectives of a random burst communication system such as herein proposed. In the absence of a positive method of insuring frequency differences however, it would be possible for two or more transmitters to repeat overlapping transmissions for an extended period of time, because their repetition rate oscillators could drift into close synchronization and remain in close synchronization for extended periods of time. For the same reasons that free running repetition clocks should give a low incidence of mutual interference, extended periods of interference are also probable, since the rates and phases of any two could drift into synchronization.

Figure 6:
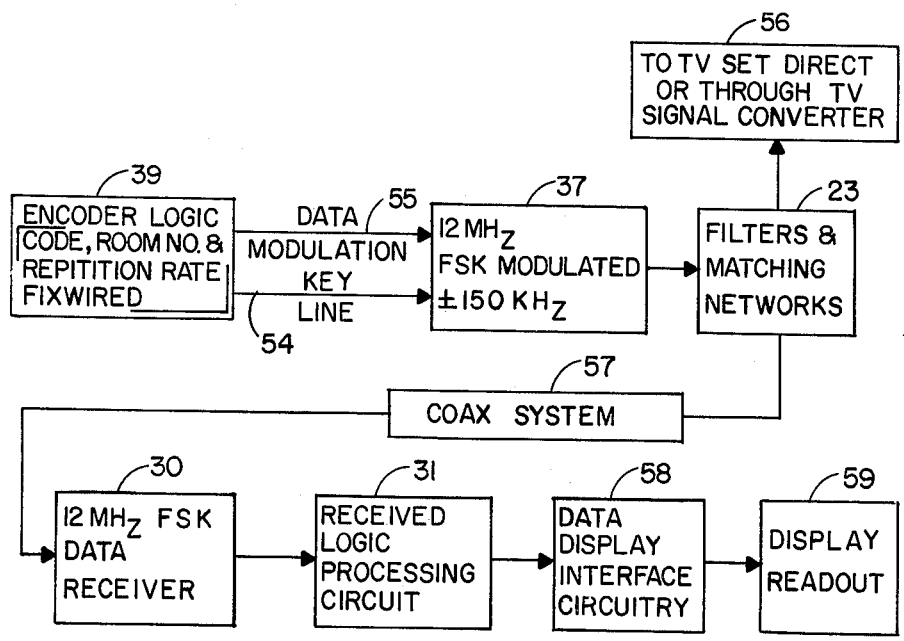
Figure 7:
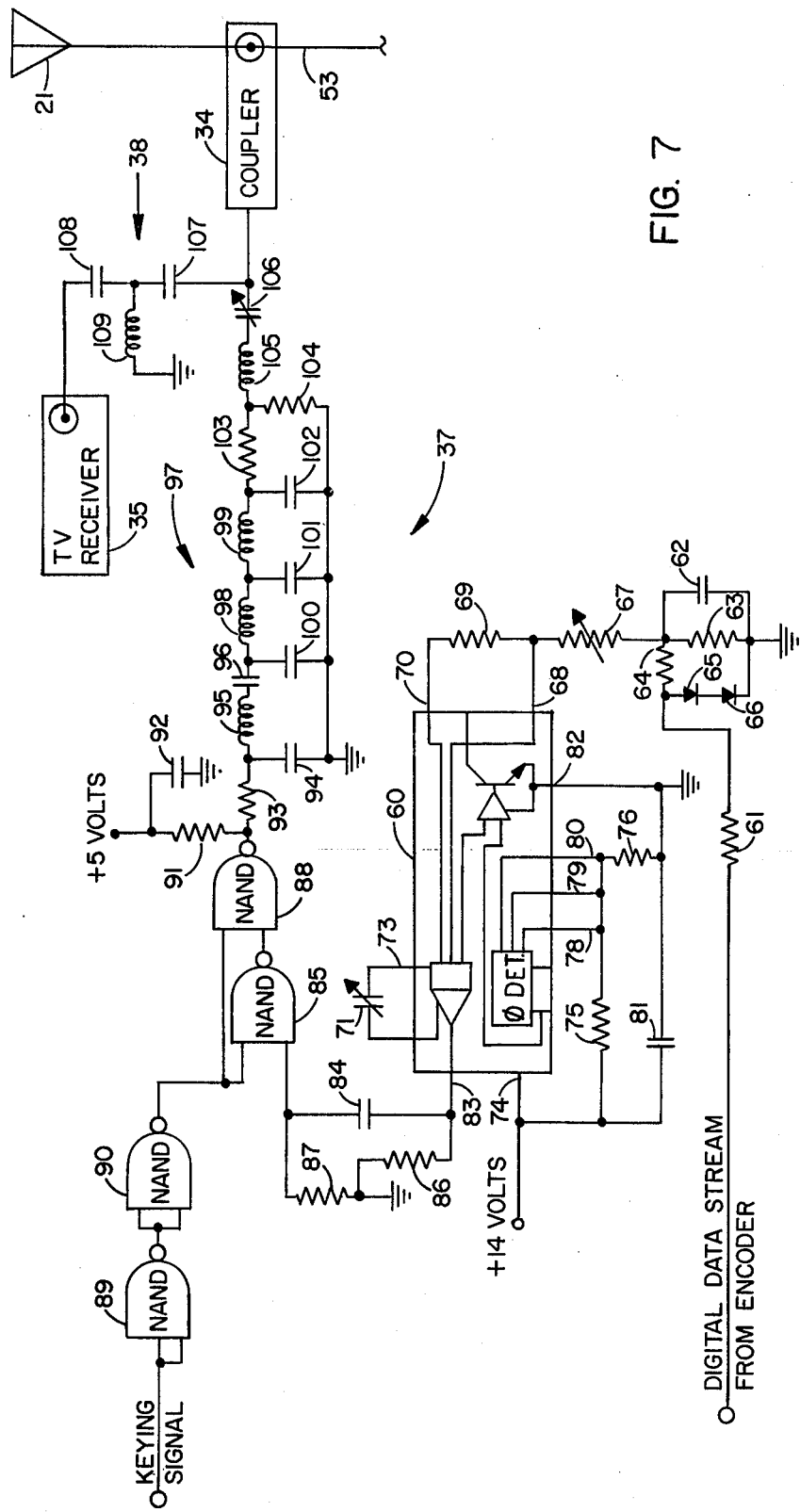
Figure 8:
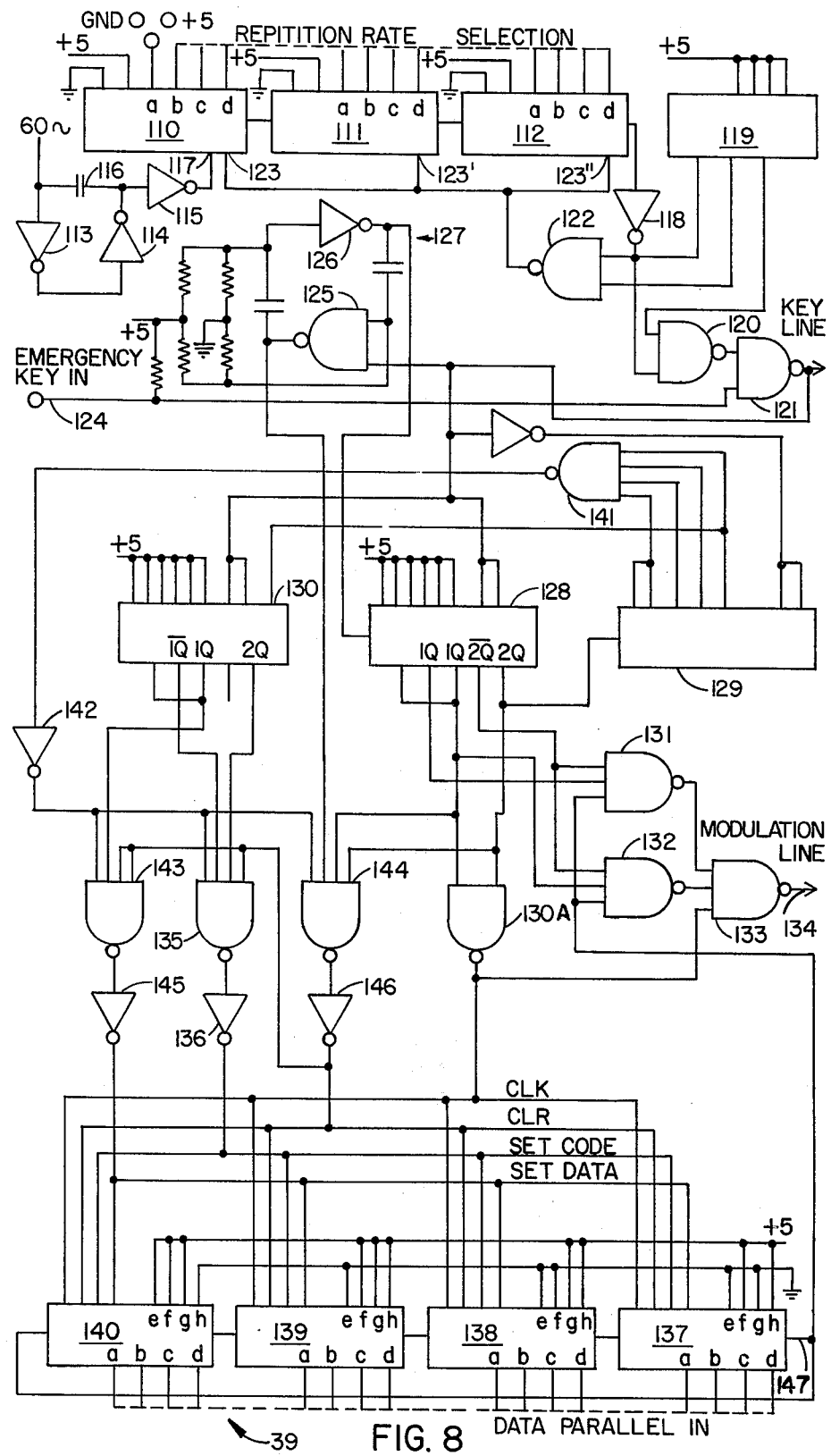
Figure 9:
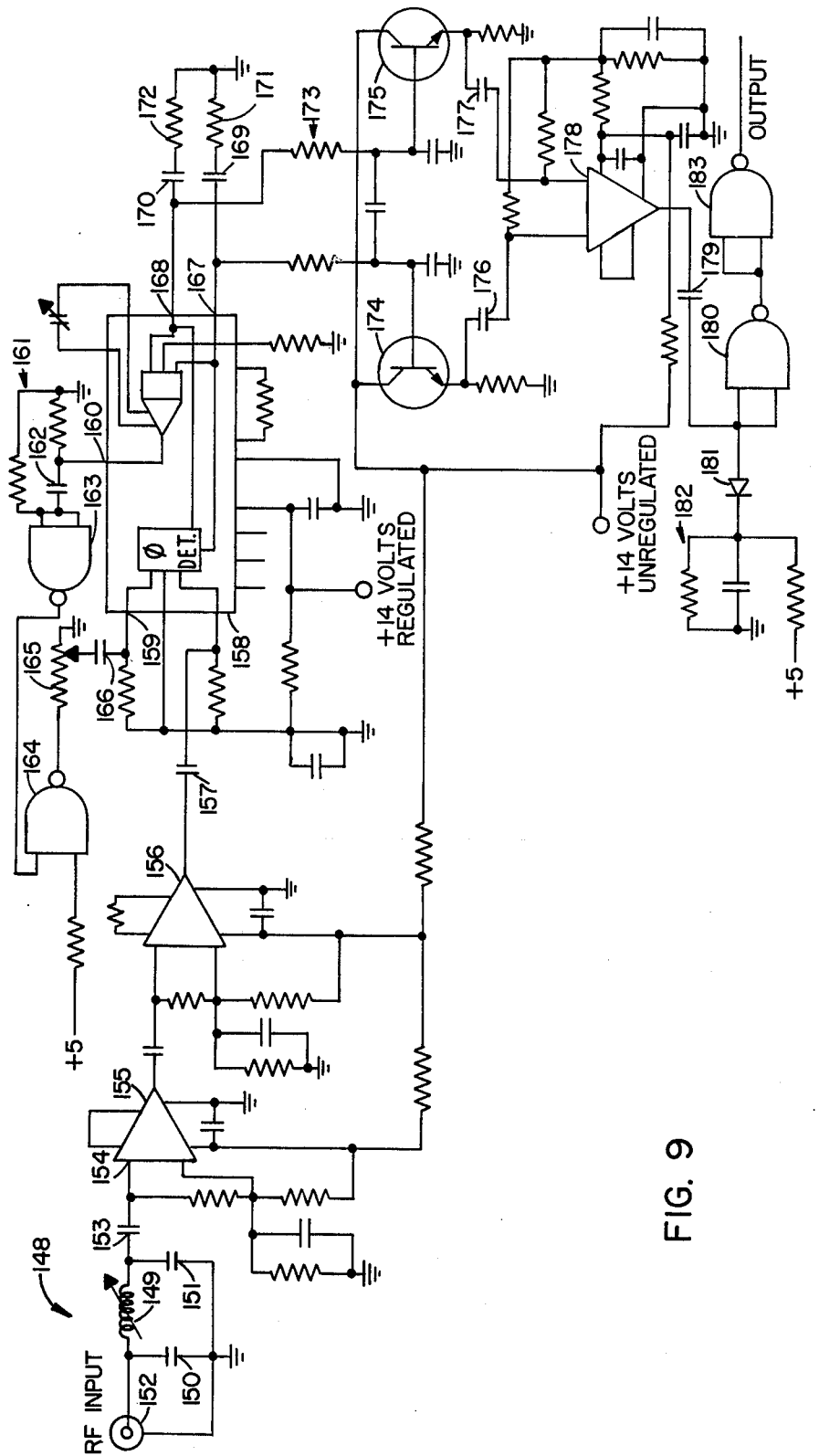

A specific embodiment representing what is presently regarded as the best mode of carrying out the invention is illustrated in the accompanying drawings. In the drawings:

FIG. 1 represents a block schematic diagram of applicant's burst FSK data RF communication system as applied in a TV cable system;

FIG. 2, a waveform showing of bit structure;

FIG. 3, the waveform of sequence 1001 with embedded clock;

FIG. 4, the waveform of 64 bit burst signal design;

FIG. 5, a diagramatic showing of the message validation process;

FIG. 6, a block diagram of the digital data transmission system;

FIG. 7, a block schematic of an FSK RF transmitter and RF output circuit;

FIG. 8, a block schematic of the encoder logic circuit;

FIG. 9, a block schematic of an FSK RF receiver and RF input circuit; and,

FIG. 10, a block schematic of the receiver logic circuit.

Referring to the drawings:

The cable TV system 20 of FIG. 1, equipped with an RF communications and TV program monitoring system, is shown to have a conventional TV video receiving signal antenna 21 feeding an amplifier section 22 having an output connection to MATV system distribution network 23 that may also include signal combiner, amplifier and filter circuitry. Additional video input signals may be added at unused channel frequencies via MATV system distribution network 23 from one or more of a plurality of like or dissimilar sources such as a microwave link receiving antenna 24 feeding an input to microwave receiver 25 that provides an output converted through modulator translator 26 to a video signal applied to the network 23. Video tape player 27 also provides outputs converted through modulator translator 28 as additional video inputs to distribution network 23. The distribution network 23 also has an RF coupled output connection 29 to RF receiver and FSK demodulator circuit 30 that is output-connected for passing demodulated message content therefrom to the central processor 31. The TV video signal output from distribution network 23 is applied to power dividers circuit 32 with a typical branch output line 33 thereof extended serially through a plurality of couplers 34, 34', and on, for TV sets 35, respectively, at different locations down the distribution cable line 33. Each of the couplers 34, 34', and on, is signal connected to, and associated with, a program selector control box 36, including an RF transmitter and FSK modulator section 37, a high pass filter section 38, and a data encoder section 39 output signal connected to the RF transmitter and FSK modulator section 37. The high pass filter section 38, that passes TV RF signals and other high frequency signals while blocking lower level RF signals of the RF transmitter, is output connected as an input to high frequency signal converter 40, and also to switch contact 41. The output of signal converter 40 is connected to switch contact 42 that is shown to be in selective contact with switch arm 43 for special programming input to TV set 35. The switch arm 43 that is input connected to the TV set 35 shown is movable to contact with switch contact 41 for conventional TV programing input to the TV set. Mechanical interconnect link 44 that interconnects switch arm 43 and data encoder section 39 activates the data encoder section for special programing modulation input to FSK modulator and RF transmitter section 37.

Standard 60cps power line connections provide a standard frequency to each RF transmitter in sections 37 at each TV location in the system with determination of the repetition period of each RF transmitter accomplished by counting cycles of the 60Hz frequency of the power supplied. Individual but fixed periods of repetition are set differently for each transmitter by assigning a different cycle count of the 60Hz power signal as the repetition count unique for each transmitter. Transmission bursts are limited to a span of time that is less than a full period of the 60Hz signal for each transmitter. With this approach, while interferences by simultaneous transmissions will occur, adroit selections of sets of numbers define different repetition periods for the transmitters setting the incidence of interference at a low value. Considering two transmitters $T_1$ at 7201 cycles and $T_2$ at 7199 cycles per repetition the time for a full cycle of all possible interference relationship, $T_i$ is defined by the following equation: $T_i = KP_1 = LP_2 = 7201K = 7199L$ where K and L are integers of the smallest value to satisfy the equations. Obviously, for this case, since 7201 and 7199 have no factors in common: $L=7201$ and $K=7199$; and $T_f$=51,839,999 cycles (i.e., $T_f$=863,999 seconds). This means that if these signals ever interfered once, their second interference would be 240 hours later, and in the meantime each would communicate one message every two minutes, approximately. If periods are chosen having a large number of common factors, the interferences are potentially closer. However, if their relative phases are such that at their closest approach to interference, their transmissions are not coincident, it can be shown that they would never interfere. In general, however, some interference between simultaneous transmissions must be tolerated, particularly with the interference incidence sufficiently low, with successive periods of sequential interferences sufficiently short, and with message content both slow to change and inherently repetitious as well as being short. H follows that odd number repetitions timed to occur at roughly every two minutes (or, approximately 7200 cycles of the 60Hz power signal) is a good choice for a few hundred burst message transmitters using an RF frequency, for example, of 12MHz to a single receiver. An appropriately programmed computer run has proven this to be an excellent approach.

Local TV station signals are received, amplified, and distributed at a high level to the individual TV users within the system complex. Supplemental TV material is received by microwave or from local video playback equipment and rebroadcast into the system in the spectrum space between channels 6 and 7 and at the point of introduction into the MATV or CATV complex, the supplemental TV material signal (or signals) is unavailable to a standard TV receiver at the user's location. The user has a choice of television material; the regular standard TV signals, at no cost to the user, or the output of the local TV converter. This converter 40 translates the supplemental TV signals into a channel (or channels, respectively,) normally not used by TV stations in the area. Whenever the converter is in use, at least for some settings, a message element (single digital bit) is generated for transmission by applicant's burst mode FSK modulated RF transmission system. In addition to the channel in use, data in the system code format illustrated message bit space is provided that is usable to designate fire, intrusion, and housekeeping status, such as completion of service by the maid. Further, an emergency data transmission capability is included that usurps the usual burst mode data transmission mode for a continuous transmission mode. Each encoder 39 is a digital logic unit that generates the digital message including necessary switching and timing functions as a modulation input to the FSK transmitter 37 that, in turn, supplies a 12MHz frequency modulated signal to the CATV coaxial distribution system. The burst mode FSK receiver 30 recognizes the output of the various FSK transmitters 37, decodes the FSK modulations and supplies the digital information to the local data display and/or readout printing (i.e., processor 31) from which individual users may be billed for use of supplemental TV material.

The message format as used in this example has data limited to 16 bits, but nothing fundamental imposes this as a limit either way. Thus, systems of more or less bits per message can be accommodated by corresponding design modifications, keeping in mind that short messages are to be preferred—if not required—since the essence of the system is burst mode operation from many message sources. The signal system uses a serial message clock embedded in the message format at the transmission ends, with the message being a serial stream of bits requiring use of message clock at the receiving end to demodulate the message data. Use of this system with embedding of the clock at the transmitter end eliminates lock-on or reconstruction or synchronization of the receiver clock at the detection point. With unsynchronized transmitter bursts, it also follows that the serial message clock rates are also unsynchronized and are free running, advantageously constrained only to approximately the same rate.

With reference to FIG. 2, it is seen that the waveform of individual transmitted bits is separated into three parts. The first part is a transition to logic 1, while the last, or third, part is limited to logic 0. With this construction, the message clock is initiated by the transition from 0 to 1 at the beginning of each message bit element and applied at approximately half of the duration between successive bit leading edges as the receiver sampling time. This is approximately midway in the digital data portion of the bit structure, with digital data transmitted as logic 1 or 0 between the first and last parts of each message bit element.

Generally, the message element portion is made approximately twice as wide as the first and last sections. No fundamental limitation dictates this choice except that with this bit waveform structure, the message transmission time utilization efficiency relative to the clock structure is 50%, or half time, for message and half time for clock. The positive going leading edges of successive bits are recognizable at the receiver, and the signal is sampled at half the duration between successive leading edges. FIG. 3 illustrates a four bit logic 1001 sequence with four sections per bit time wise through from $T_0$ to $T_{16}$.

Receivers in communications systems like this need time to recognize the occurrence of an individual transmission burst, and must receive bursts centered on slightly different carrier frequencies from different transmitters. Since time is required for the receiver to lock to each signal, if data were transmitted in the first part of each message burst format it would have a high probability of being lost or misdirected. For this reason, each message burst in the system described (as shown by FIG. 4) is started with an empty sequence (i.e., 16 bits all logic 0), although it could be all logic ones, or any preset combination that is a sacrificial section serving little, if any, message purpose. Use of 16 blanks at the beginning of each burst transmission is convenient in the design of the encoder 39. After the 16 bit empty sequence there is a 16 bit data frame A followed sequentially, time wise, by a 16 bit code frame, and then a 16 bit data frame B—actually a duplicate of frame A. In the 16 bit data frame, ten binary bits for room identification would give 1023 individual identifying numbers, and two of the remaining six bits of the message words are allocated to two supplemental TV channels, one to each, while the remaining four bits are allocated to expansion functions. These are simple "on-off" of each bit to indicate the state of other sensed things such as housekeeping status, fire alarms, intrusion, etc.

A prominent problem at the receiver end is how to recognize the beginning of the 16 bit message frame, or its end. Message overlays, initial lock-on periods, and other signals which may interfere, all contribute to the problem of recognizing the end points of a digital message. For example, consider a message like 011 011 000 111 1011 or $062173_8$ and suppose that the leading zero was missed and the message is thought to start one bit later for 110 010 001 111 011X. Now the message becomes $144367_8$ or $144366_8$, depending on the last bit X being 1 or 0, respectively. Both messages would be wrong, especially so if room $367_8$ were to be billed rather than $173_8$. This end-point identification problem is solved by placing a fixed code in the frame following the first data frame. Again, 16 bits are employed for this code, primarily as a matter of logic design convenience. At the receiver, whenever the 16 bit code is recognized, the 16 bits, data frame A, received immediately ahead of the code frame could be accepted as valid data. However, with a 16 bit code there exists a 1 in $2^{16}$ chance that the data would be the same as the code frame. At this point, the choice of a code is of concern, and most certainly a code should be chosen that has a great deal of asymmetry so that noise and resultant detection errors cold not result in a failure to recognize the beginning and end of the message frame. Tentatively, the proposed code is 10 10 11 00 11100111. The data frame A message structure is compared with data frame B, which is bit-for-bit identical to that of data frame A. Then, at the receiver, it is possible to insist for bit-to-bit agreement of teh data frames A and B, as well as for agreement with the fixed and assigned code. These constraints at the receiver give a very low probability that noise, interference, or the like, could create a 48 bit sequence that would be acceptable as a valid data transmission.

Reference also to the diagramatic showing of the message validation process in FIG. 5 is helpful in understanding the receiver data acceptance process. The serial input 45 from the FSK demodulator in receiver 30 is applied, in the serial form of data frame A, followed by the code frame, and finally data frame B, 16 bits each totaling 48 bits, as the primary input to 48 bit shift register 46. The embedded data clock 47 is derived from this primary input and also applied to the 48 bit shift register 46. The first 16 bit data frame A is compared with the last bit data frame B, that should be identical in length and in content, in 16 bit comparitor 48 to develop an output fed as an input to AND gate 49. The 16 bit code frame between data frames A and B is compared for 16 bit length and content with the fixed wired code source 50 in 16 bit comparitor 51 for developing the second input to AND gate 49. The output connection of AND gate 49 is connected as an activating input to 16 bit message-holding register 52. This 16 bit message-holding register is also connected for receiving the 16 bit data frame A message from the 48 bit shift register 46 that is ultimately released by the output of AND gate 49 as an output to data display 53.

Under these signal design constraints, the probability that a receiver could produce a false message is $1/2^{16}$ for agreement with the code times $1/2^{16}$ for bit-by-bit agreement of the two data frames for a total probability of false readout of $1/2^{32}$. Since the receiver is open and exposed to all kinds of other radiated signals, pulses, and noise, 90% of the time, with valid signals being received almost at random, and even then only 10% of the time is it essential that the false alarm rate be very low. Further, it is of interest to note that the 16 bit clear frame serves to pump out the remnant part of the last acceptable message so that overlapped message elements from different transmitters also have a low chance of producing a false readout. This construction uniquely provides a "signal presence" function whereas most random message transmission systems have, as a weak point, the need to know when a valid signal is present rather than just noise.

A central element in both transmitters 37 and receiver 30 of the system is a purchased integrated circuit, FSK modulator/demodulator, type XR-210 from EXAR Integrated Systems, Inc., Sunnyvale, California. This single chip includes a voltage controlled oscillator (VCO), a phase detector, and a feedback amplifier with the VCO usable to generate FSK signals from very low frequencies to frequencies in excess of 12MHz and at high modulating rates. The phase detector thereof is also capable of operating over a wide range of frequencies, and in combination with the VCO function, can be used to detect FM or FSK with appropriate feedback connections.

With reference to FIG. 6, it may be seen that the overall data transmission system has five major subsections. These include the data encoder 39, the FSK modulator RF transmitter unit 37, filters and matching networks 23, FSK data RF receiver 30, and processor 31. The encoder 39 accepts digital data inputs including that of the pre-wired room number identification (ID) with each encoder pre-wired to output a digital message upon completion of its assigned count of 60Hz periods. The encoder provides a key line 54 signal that lasts through a full burst of digital data modulation waveform output on line 55. The FSK modulator accepts the key signal and the accompanying digital data to generate the FSK'd 12MHz output signal. The filters and matching networks section 23 reject undesired RF components such as harmonics of the 12MHz from FSK modulated RF to avoid disruption of TV service. The FSK data modulated RF receiver 30 detects the frequency modulation on the 12MHz carrier and processing circuit 31 digital receiving point logic restores the data to 16 bits that is the digital data of the transmitter 37; i.e., 6 bits of user data plus 10 bits for the room identification (ID). There is a connection out of the filters and matching networks to the section 56 indicated to TV set direct or through TV signal converter, a coax system 57, and connection from processing circuit 31 through data display interface circuitry 58 to display readout 59.

With reference to the RF transmitter and FSK modulator and RF output circuit 37 of FIG. 7, only the VCO feature of the XR-210 integrated circuit 60 is employed at the transmitter. The digital data stream from encoder 39 is fed through series input resistor 61 that forms with shunt capacitor 62 and resistor 63 in parallel to ground and resistor 64, a low pass (LP) filter roundingoff FSK transitions so that the spectrum received for the 12MHz signal is not excessive. Shunt diodes 65 and 66 advantageously serve to restrict modulation voltage swing since different encoders deliver different hi-low modulation voltages, and these diodes standardize the modulation amplitude. The LP filter is connected, and the modulation signal path extends, through adjustable resistor 67 to input 68 and on through resistor 69 to input 70 of the XR-210 integrated circuit 60. A relatively small variable capacitor 71 between terminals 72 and 73 and variable resistor 67 set the operating frequency of the XR-210 integrated circuit 60 to 12MHz in accord with the integrated circuit design thereof. A power supply of +14 volts is applied to terminal 74 and through a voltage divider of resistors 75 and 76, connected between +14 volts and ground, and at the junction of resistors 75 and 76 to terminals 78, 79, and 80. Capacitor 81 is connected in parallel with the voltage divider to ground and terminal 82 is connected to ground.

The frequency modulated RF signal output from output terminal 83 of the XR-210 integrated circuit 60 is fed through signal coupling capacitor 84 as one input to TTL NAND logic gate 85 with the opposite sides of capacitor 84 connected, respectively, through resistors 86 and 87 to ground. With the signal level at output terminal 83 not suitable for supplying the RF signal output directly, isolation from the output circuit is provided by the two stages of TTL NAND logic gates 85 and 88 connected in series cascade with the key signal from the encoder being half of each dual input. Two additional NAND gates 89 and 90 are series connected in the keying signal path since four stages are provided by a single series 7400 TTL integrated circuit. The two NAND gate 85 and 88 logic gate stages are used to achieve at least 60db attenuation when the key signal is off, with one stage giving slightly less than 40db attenuation when off, a level of attenuation not felt to be sufficient in all instances. Use of logic NAND gates as all saturated switching mode solid state gate device logic elements as an RF amplifier transmitters in a communication system such as described and claimed in my co-pending U.S. Pat. application S.N. 425,523 Filed Dec. 17, 1973 now U.S. Pat. No. 3,870,235, entitled "ALL SATURATED SWITCHING MODE SOLID STATE RF AMPLIFIER" to switch the 12MHz output has proven very satisfactory. In fact, the NAND gates have been found to develop about 10MW at 12MHz an output power level more than required for the system.

The output of NAND gate 88 is connected through resistor 91 to plus 5 volts having a connection through capacitor 92 to ground and also through signal path resistor 93 to an impedance matching section with capacitor 94 to ground and signal path series connected coil 95 and capacitor 96 of low pass filter and impedance matching network 97. The network 97 is provided to reject undesired harmonics from the 12MHz output of the NAND gates that is very rich in harmonic content with such switching mode logic active devices being used so that the basic data communications at 12MHz can co-exist with TV signals throughout the coax system. Please note that while this system is presented and described with respect to a coax TV distribution system, such burst mode signal communications could be sent out over the air and through other media as well in complete working systems. Network 97 includes a low pass Butterworth filter section, with coils 98 and 99, and capacitors 100, 101, and 102, output connected through termination and series resonent circuitry with resistors 103 and 104, and serially, coil 105 and adjustable capacitor 106 to bridging coupler 34. The high pass filter 38 connection located between coupler 34 and TV receiver 35 includes capacitors 107 and 108 and from the junction of the capacitors connection through coil 109 to ground.

The data encoder 39, shown in detail in FIG. 8, organizes the digital data in generating the FSK serial data stream supplied as the modulation input to the RF transmitter 37, controls the periodicity of the transmitter bursts with a keying signal input, and formats the 64 bit message structure. The data encoder operation is coordinated through five basic portions including: first, the repetition period generator; second, the gated data clock; third, the digital element generator; fourth, the word format generator; and, fifth, data storage.

The repetition period generator uses three type 74193 IC's (integrated circuits), and one type 7476 Dual J-K Flip Flop as a scale y z counter, each 4 bit up or down binary counters 110, 111, and 112 used in the count-down mode in generating the repetition period by counting cycles of the 60Hz power line. The 60Hz power line is connected through three inverter stages 113, 114, and 115 connected in series cascade with regenerative feedback including capacitor 116. This is with a low voltage sample of the power line voltage sharpened into a suitable TTL clocking waveform through the three stages and applied to terminal 117 of binary counter 110. Whenever the count in counter 110 decreases through 0000, a "borrow" pulse is supplied from counter 110 to an input of counter 111 and likewise from counter 111 to counter 112, and then from counter 112 through inverter stage 118 to a type 7476 integrated circuit 119. IC 119 uses one of two J-K Flip Flops as a scale of two counter with when IC 119 is in the $Q=1$ state the borrow pulse from counter 112 is used to key the transmitter on through NAND gates 120 and 121 and to cause generation of one or more digital output streams of 64 bits. Then when the IC 119 is in the $Q=0$ state, the borrow pulse is fed as an input through NAND gate 122 to terminals 123, 123', and 123'' of IC counters 110, 111, and 112 to cause the counters to initialize at a numerical value determined by the connections $a$, $b$, $c$, and $d$, respectively, of the counters 110, 111, and 112 to provide a specific repetition rate set for that transmitter different from the repetition rate of the other transmitters in the system. The first time each 4-bit counter counts to 0000, it has been started from a number equivalent to 0 through 15, and thus requires a corresponding number of counts to reach the first 0000 condition following initialization (or load) by a pulse at its pin 123. Subsequent countdowns require 16 input pulses. The first time the borrow pulse is outgated from IC112, therefore requires a totality of pulses as might be described by the following equation:

Pulse Control = $2046d_3 + 1024c_3 + 512b_3 + 256a_3 + 128d_2 + 64c_2 + 32b_2 + 16a_2 + 8d_1 + 4c_1 + 2b_1 + a_1$ Where the individual coefficients = 0 if the corresponding input to the counter = 0, or coefficient = 1 where the corresponding counter input is wired to +5DC in accord with the following tabulation:

| Pin | INTEGRATED CIRCUITS | | |
| --- | --- | --- | --- |
| | 110 | 111 | 112 |
| a | $a_1$ | $a_2$ | $a_3$ |
| b | $b_1$ | $b_2$ | $b_3$ |
| c | $c_1$ | $c_2$ | $c_3$ |
| d | $d_1$ | $d_2$ | $d_3$ |

The interval from the first to the second borrow pulse is always 4096 counts. In this fashion, IC's 110, 111, 112, and 119 comprise a counter which can count between 4096 and 8191. This repetition period is different for each transmitter and is always an odd number (i.e., pin $a$ of IC110 is always connected to +5 volts). It is the essence of the interference control plan for the individual stations to respond at incommensurate repetition rate intervals. These intervals are established as being different for each unit by selective wiring at the time of assembly.

The transmitter enable gate is developed from the first borrow pulse. This pulse is roughly equal to one half-period of 60Hz, or 8.3Ms. The transmitter burst and 64 bit message format is completed in roughly 6.4Ms and may in fact be transmitted slightly more than once since the data clock is not forced into any relationship with the duration of the burst. The concept is not limited to one half-period, nor to a burst duration of 6.4Ms, these however being dimensions or parameters suitable to the application at hand. A much wider burst would increase the probabilities of mutual interferences since, with the design of the moment, repetitions on the order of integral periods of separation are structured. An emergency key in line 124 is provided as a second input to NAND gate 121 in order that an override emergency transmit operate state exist when certain sensors detect an emergency.

The second borrow pulse serves to reload the fixed wired repetition period number into the repetition rate counters. This is passed from the key line output of NAND gate 121 as an input to NAND gate 125, part of an IC with NAND gates 120, 121, and 122, the other input terminal and output terminal of which along with inverter 126 are wired into a feedback oscillator circuit 127. This circuit 127 oscillates at approximately 40KHz whenever the repetition period counter IC119 generates the transmitted key signal, but otherwise is dormant. The IC's 128, 129, and 130, with 128 and 130 type 7476 IC's, and 129 a type 7493 IC, are wired to count by 4, 16, and 4, respectively, and during the dead interval between transmitter bursts reset to all zero states. Immediately with the first cycle from the gated clock IC128 begins to count clock pulses by 4, and subsequently its output is counted by 129. The binary state 11 of IC128 is decoded by NAND gate 130 A and NAND gates 131, 132, and 133 in an operating circuit to generate the logic 1 part of the digital element waveform structure of FIG. 2 passed out on the modulation outtput line 134 to the respective transmitter. States 00 and 01 select the appropriate digital data element while state 10 provides the "0" element at the end of the bit structure, with the gated clock providing 4 periods for each output bit. IC129 counts 16 such bit periods, or 64 clock periods, to allow for the 16 bit word structure, and finally IC130 counts four 16 bit words by counting the output of IC129.

The binary state 10 of IC130 generates the set code pulse applied therefrom via NAND gate 135 and inverter 136 to the serial shift register formed of IC's 137, 138, 139, and 140 wired together as a serial shift register using 7494 type IC's. There is also a terminal connection of IC130 to NAND gate 141 having other input connections from IC129 and an output connection through inverter 142 to NAND gates 135, 143, and 144. Binary states 01 and 11 of IC130 generate the set data pulse applied to the IC's 137, 138, 139, and 140 serial shift register via NAND gate 143 and inverter 145. The clear pulse generated by binary state 1111 of IC129 and by binary state 11 of IC128 is applied through NAND gate 144 and inverter 146 to the serial shift register to clear the shift register before each change of state of IC130. The serial shift register IC's 137, 138, 139, and 140 are each 4 bit serial shift registers capable of being parallel loaded from either of two data sources, and may also be cleared of all data if set to 0000 by the clear pulse. IC's 137, 138, 139, and 140 are connected head to tail to form an endless 16 bit serial shift register with clock provided by state 11 of IC128. The set data pulse is preceded by a set clear pulse at which time the data parallel input at pins a, b, c, and d of each of IC's 137, 138, 139, and 140 are used to preset the 16 bits of the shift register. Subsequently, the data is shifted 16 times to generate the data stream at terminal 147 of IC137. Room number identification (ID) is prewired into pins a, b, c, and d of IC's 140 and 139, and to pins a and b of IC138. This gives a capability of 1023 non-zero room numbers without a repeat. The remainder of IC138 and all of IC137 provide 6 bits that can be used for digital data. The distribution is not requisite nor unique, and equivalent systems using more or less bits are within the range of the concept utilizing smaller or extended shift registers and corresponding circuit adjustments to match as may be required. The set code pulse implements utilization input of the data fixed wired to pins e, f, g, and h, respectively, of IC's 137, 138, 139, and 140 that are shown as prewired to a specific individual fixed code. Again, the code is fixed only as a matter of convenience with variable codes not excluded nor with the structure to be limited to 16 bits per word, 4 words per frame, etc. The interconnect circuit with NAND gates 131, 132, and 133 operates on the digital data stream from IC137 to make the middle two clock periods of the output equal to the digital data from the 16 bit shift register.

The RF receiver 147 of FIG. 9 is a receiver such as used in the RF receiver and FSK demodulation section 30 of FIG. 1 to receive burst FSK RF data transmissions from many transmitters 37 in a communications system. A pi-matching section 148, with adjustable coil 149 and capacitors 150 and 151, is connected to coaxial cable 152 that, via the distribution system 23, is RF signal connected to RF signal line 33 and/or coax line 53 of FIG. 7. Plase note that, while the burst FSK RF data transmission system is shown as communicating through cable, the concept is equally applicable to transmission through other media between transmitter and receiver such as going out on the air via normal radio RF signal transmissions. In any event, the pi-matching section 148 gives an impedance match from 75ohms of the coax line 152 to, with RF signals passed through signal coupling capacitor 153, an input impedance of 1500 ohms at input terminal 154 of 12MHz RF amplifier stage 155. Amplifier stage 155 and amplifier stage 156 form a two-stage 12MHz RF amplifier using Signetics type 592 wide band dual input operational amplifier IC's. The first RF operational amplifier stage 155 is strapped for a nominal gain of 400 while the second RF operational amplifier stage 156 is connected for a nominal gain of about 100 with both stages used in the single ended mode. The RF signal output of the second RF operational amplifier 156 is passed through RF signal coupling capacitor 157 as a signal input to the XR-210 integrated circuit 158 used in the receiver 147. The phase lock loop oscillator of IC 158 performs the important task of demodulation of the FSK data from the received 12MHz burst carrier signal transmissions. Another phase detector input terminal 159 uses a sample of the voltage controlled oscillator output appearing at terminal 160 of the XR-210 integraged circuit 158 with, however, this signal passed through a loop 161. Terminal 160 is connected through signal coupling capacitor 162 to the dual inputs of NAND gate 163 of a 7400 Quad NAND gate IC having an output connection as an input to NAND gate 164, also of the 7400 Quad NAND gate IC, with another input from +5 volts and output connection through variable resistor 165 and capacitor 166 to phase detector input terminal 159. While the phase detection output is internally connected to the VCO within the XR-210 integrated circuit 158, it is made available at terminal pin 167 and in its opposite phase at terminal pin 168 of the IC 158. Capacitors 169 and 170 along with resistors 171 and 172 and internal circuit impedances to pins 167 and 168 together comprise the VCO feedback loop that, with the phase lock loop closed, provides the VCO feedback signal necessary to insure phase lock of the signal. With the signal being frequency modulated, the feedback signal is then a replica of the FSK modulation applied through RC network 173 to the base electrodes of emitter follower NPN transistors 174 and 175. The emitter follower transistors 174 and 175 present a high impedance load to the feedback signal source terminal pins 167 and 168 and provide a low impedance output that is RC coupled with the signal path through capacitors 176 and 177 to the dual inputs of wide band operational amplifier 178 (a type 733 such as manufactured by Fairchild with an input typically ±0.1 volts, peak to peak, and with its output typically 2 - 4 volts, peak to peak). The output of amplifier 178 is ac coupled through capacitor 179 to the inputs of NAND gate 180 where diode 181 with circuit 182 clamps the ac signal to a limit of approximately +2 volts. The following inverter NAND gate 183 supplies the detected signal levels as the digital data encoded signal input to the receiver logic circuit 31 of FIG. 10 where the signal is a one-to-one replica of the modulation signal developed by the respective data encoder circuits 39. NAND gates 180 and 183 are also included within the 7400 Quad NAND gate IC including NAND gates 163 and 164.

The detected signal output fed from the FSK RF receiver circuit 147 of FIG. 9 is passed as the input to receiver logic processor circuit 31 of FIG. 10. Note again that the signal passed through the signal interface to the receiver decoder logic circuit is a detected replica of the encoder signal modulating respective FSK RF transmitters 37. This input signal is applied to a one-shot (O/S) flip-flop circuit 74121 IC 184 and to the serial data input terminal 185 of the 7495 IC 186. The one-shot IC 184 is triggered by the leading edge of the input signal applied to input terminal 187 to develop a single positive pulse at output terminal 188, with the trailing edge of this pulse corresponding to the middle of the signal segment portion representing "data." The inverters 189 and 190 invert the pulse outpt of the one-shot flip-flop circuit and provide this as "clock drive" to a 48 bit serial shift register including the 7495 IC's, 186, 191, 192, 193, 194, 195, 196, 197, 198, 199, 200, and 201.

The serial input data fed to the input terminal 185 of IC 186 is shifted through the 48 bit serial shift register with IC's 186 and 191 through 201 being type 7495, 4 bit serial shift register units with parallel load and access. However, the parallel load feature is not used while the parallel access or parallel bit-by-bit read is used. The IC type 7485, 4 bit magnitude comparitor units 202, 203, 204, and 205 are connected in cascade for 16 bit magnitude comparison with, however, only the magnitude equal output used. IC 202 compares the data in IC 186 and IC 198; IC 203 compares IC 191 and IC 199; IC 204 compares IC 192 data with IC 200 data; and IC 205 compares IC 193 data with IC 201 data. Then whenever the binary magnitude represented by the 16 bit data in IC's 186, 191, 192, and 193 is exactly equal to the binary magnitude represented by the 16 bit data in IC's 198, 199, 200, and 201, a data alignment (DA) pulse is generated at output terminal 206 of magnitude comparitor unit 205, since the data in 198, 199, 200, and 201 is 32 bits ahead of the data in IC's 186, 191, 192, and 193, the DA pulse is generated whenever the received data frames are in agreement. At the same instant the DA pulse is generated, the 16 bits representing the code frame are resident in IC's 194, 195, 196, and 197. Integrated circuits 207, 208, 209, and 210, as 4 bit magnitude comparators type 7485 IC's, are connected in cascade to generate the code alignment (CA) pulse whenever the received 16 bit code frame agrees with the prewired code input to one side of the comparitor string of IC's 207, 208, 209, and 210. This is with the other side of these comparitors connected to the parallel output of the shift register of IC units 194, 195, 196, and 197.

Thus, as a 64-bit message is received it is shifted one bit at a time through a 48-bit shift register. Then as the "clear" frame falls off at the end of the 48-bit register, for a period of a signal bit, the second data message frame is aligned in IC's 186, 191, 192, and 193, with the first data maessage frame in IC's 198, 199, 200, and 201, to cause generation of the DA pulse while, simultaneously, the received code frame is aligned with the fixed wired code applied to IC's 194, 195, 196, and 197, to cause generation of the CA pulse. If, however, one or more code bits are wrong, the CA pulse is not generated; and if one or more data bits do not agree, the DA pulse is not generated. Therefore, the simultaneous generation of DA and CA pulses signals a valid signal reception. It is important to be able to retain the data frame of a valid reception; particularly, with data in the serial shift register of IC's 186 and 191–201 being almost continuously shifted through—if not by true signals, then by noise, since signal clock is not distinguishable from thermal (or other) noise. This is accomplished by off loading of transiently recognized valid data into more permanent storage in IC units 211, 212, 213, and 214, that are type 7495 IC 4 bit shift registers connected for parallel loading from IC stages 186, 191, 192, and 193. The CA and DA pulses are combined by NAND gate 215, that is a type 7410 IC, with the output going to logic 0 only when DA and CA are both logic 1. The signal inverter 216 provides a positive going pulse to one-shot IC 217, a 7421 type IC that generates a pulse at output terminal 218 shorther than the DA and CA pulses. This shorter one-shot pulse is applied as clock inputs to the IC units 211, 212, 213, and 214, with the load enable held high by application of +5 volts, and also as an output pulse indicating that there is data. With applications of the short one-shot pulse to IC's 211, 212, 213, and 214, valid data is offloaded in parallel from IC units 186, 191, 192, and 193, into IC units 211, 212, 213, and 214, while it is still valid. The output to display devices from IC's 211, 212, 213, and 214 is used to operate lightemitting diodes (detail not shown) to present the binary data that has been retained. The 4 bit shift register IC units 211 - 214 may also be parallel off-loaded to IC units that are 4 bit data selector function units (detail not shown) that, in turn, provide outputs to additional light-emitting diodes and to dual line drivers and on to display interface circuitry. All the interface circuits between the receiver decoder logic and display interface with the display and/or print out devices may, advantageously, be push-pull, two-wire differential level circuits, rather than single ended logic like TTL, in allowing separation between the receiver decode logic and system displays.

Such differential signal circuits provide rejection of common mode noise that is encountered with separate circuit functions with, for example, seven pairs of wires necessary for transmission of the signals between these functions in a working system.

Whereas this invention is herein illustrated and described primarily with respect to a single embodiment hereof, it should be realized that various changes may be made without departing from essential contributions to the art made by the teachings hereof.

I claim:

1. In a burst-mode frequency shift keying communications system utilizing one way transmission of digital data from a plurality of RF transmitter stations to common receiving means; a plurality of RF transmitter stations each capable of generating short burst transmissions in the form of a plurality of bit elements with signal level transitions between different logic levels with the bit element signal level transition leading edges being an imbedded clock sensed by receiver means, and with the short burst transmissions being of short time duration relative to repetition time periods between short burst transmissions from an RF transmitter station; common receiving means for receiving burst-mode frequency shift keying modulated RF signals transmitted through an RF signal transmission media from said RF transmitter stations to said common receiving means; gating means for short burst transmissions for each of said RF transmitter stations; for each transmitter station repetition period gate activating means for activating said gating means associated with said corresponding RF transmitter stations for short burst transmissions; digital signal demodulating means in said common receiving means; and signal imbedded clock detecting means in said common receiving means with said digital signal demodulating means activated by said signal imbedded clock.

2. The burst-mode frequency shift keying communications system of claim 1, wherein said individual repetition period gate activating means for said RF transmitter stations are set for different time intervals to preclude excessive message loss with only occasional message overlap.

3. The burst-mode frequency shift keying communications system of claim 2, wherein said individual repetition period gate activating means for said RF transmitter stations includes, connection to a conventional power voltage source, and power voltage source cycle counting means with each transmitter station having individual but fixed periods of repetition set differently for each transmitter station by assigning a different cycle count of the power voltage source as the repetition count unique for each transmitter station.

4. The burst-mode frequency shift keying communications system of claim 3, wherein said conventional power voltage source is a 60Hz power signal.

5. The burst-mode frequency shift keying communications system of claim 4, wherein said transmission bursts are limited to a span of time that is less than a full period of the 60Hz signal for each transmitter station.

6. The burst-mode frequency shift keying communications system of claim 1, wherein said RF signal transmission media is coaxial cabling.

7. The burst-mode frequency shift keying communications system of claim 6, wherein said coaxial cabling is existing cabling of a television signal distribution system.

8. The burst-mode frequency shift keying communications system of claim 7, with a number of said transmitter stations individually located with TV sets.

9. The burst-mode frequency shift keying communications system of claim 8, with said RF transmitter stations set at RF frequencies, to propogate through said coaxial cabling in a television signal distribution system, not affecting the reception of TV signals and not usurping additional TV channels usable for special Tv coverage.

10. The burst-mode frequency shift keying communications system of claim 9, wherein said transmitter stations are set, for transmitting said burst message RF transmissions to common receiving means, at approximately an RF frequency of 12MHz.

11. The burst-mode frequency shift keying communications system of claim 1, wherein said burst-mode frequency shift keying signaling modulated on RF uses a three part waveform structured with the first part a transition from logic 0 to logic 1, a second part variably logic 1 or logic 0, and a last part (third part) limited to logic 0; message clock time delay means in said clock detecting means initiated by the transition from logic 0 to logic 1 at the beginning of each message bit element, and applied at approximately half of the duration between successive bit leading edges for activation of said demodulating means with digital data transmitted as logic 1 or logic 0 between the first and last parts of each message bit element.

12. The burst-mode frequency shift keying communications system of claim 11, wherein each burst-mode frequency shift keying signal transmission includes a code section and a message section.

13. The burst-mode frequency shift keying communications system of claim 12, with code alignment checking circuitry in said common receiver.

14. The burst-mode frequency shift keying communications system of claim 13, with said message section repeated and data alignment checking means in said common receiver match checking the original and repeated message sections in each received burst-mode signal transmission.

15. The burst-mode frequency shift keying communications system of claim 14, with the burst-mode signal transmission having said message sections both before and after said code section.

* * * * *